(12) United States Patent
Straub

(10) Patent No.: US 11,397,849 B2
(45) Date of Patent: Jul. 26, 2022

(54) REST TRANSFORMATION

(71) Applicant: Oracle International Corporation, Redwood Shores, CA (US)

(72) Inventor: Christian Straub, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 16/003,027

(22) Filed: Jun. 7, 2018

(65) Prior Publication Data
US 2019/0095416 A1 Mar. 28, 2019

Related U.S. Application Data

(60) Provisional application No. 62/629,531, filed on Feb. 12, 2018, provisional application No. 62/564,954, filed on Sep. 28, 2017.

(51) Int. Cl.
| | |
|---|---|
| G06F 40/186 | (2020.01) |
| H04L 67/02 | (2022.01) |
| G06F 40/134 | (2020.01) |
| H04L 67/01 | (2022.01) |

(52) U.S. Cl.
CPC .......... *G06F 40/186* (2020.01); *G06F 40/134* (2020.01); *H04L 67/02* (2013.01); *H04L 67/42* (2013.01)

(58) Field of Classification Search
CPC ... G06F 17/248; G06F 17/2235; H04L 67/02; H04L 67/42
See application file for complete search history.

(56) References Cited

U.S. PATENT DOCUMENTS

| | | | | |
|---|---|---|---|---|
| 9,798,769 | B2* | 10/2017 | Meyers | H04L 67/2823 |
| 10,305,985 | B1* | 5/2019 | Ma | G06F 16/2455 |
| 2003/0026412 | A1* | 2/2003 | Ibezim | H04Q 3/0029 |
| | | | | 379/229 |
| 2004/0046789 | A1* | 3/2004 | Inanoria | G06F 8/38 |
| | | | | 715/748 |
| 2008/0016143 | A1* | 1/2008 | Bumpus | H04L 67/36 |
| | | | | 709/203 |
| 2011/0047557 | A1* | 2/2011 | Koskimies | G06F 9/4843 |
| | | | | 719/315 |
| 2015/0363378 | A1* | 12/2015 | Dolph | G06F 16/93 |
| | | | | 715/212 |
| 2016/0062739 | A1* | 3/2016 | Kaulgud | G06F 8/72 |
| | | | | 717/107 |
| 2016/0085544 | A1* | 3/2016 | Sharma | G06F 8/70 |
| | | | | 717/120 |
| 2018/0176268 | A1* | 6/2018 | Malatesha | H04L 67/42 |
| 2019/0065500 | A1* | 2/2019 | Martin | G06F 16/24552 |

* cited by examiner

*Primary Examiner* — Thomas J Dailey
*Assistant Examiner* — Aye M Aung
(74) *Attorney, Agent, or Firm* — Trellis IP Law Group, PC

(57) ABSTRACT

An embodiment provides for representation state transfer (REST) transformation. A service abstraction is received. Service templates are received. Each service template corresponds to a different one of a plurality of services. Service specific requests are provided by modifying the service templates based on the service abstraction. Each of the service specific requests are different from each other and are for a different one of the services.

18 Claims, 15 Drawing Sheets

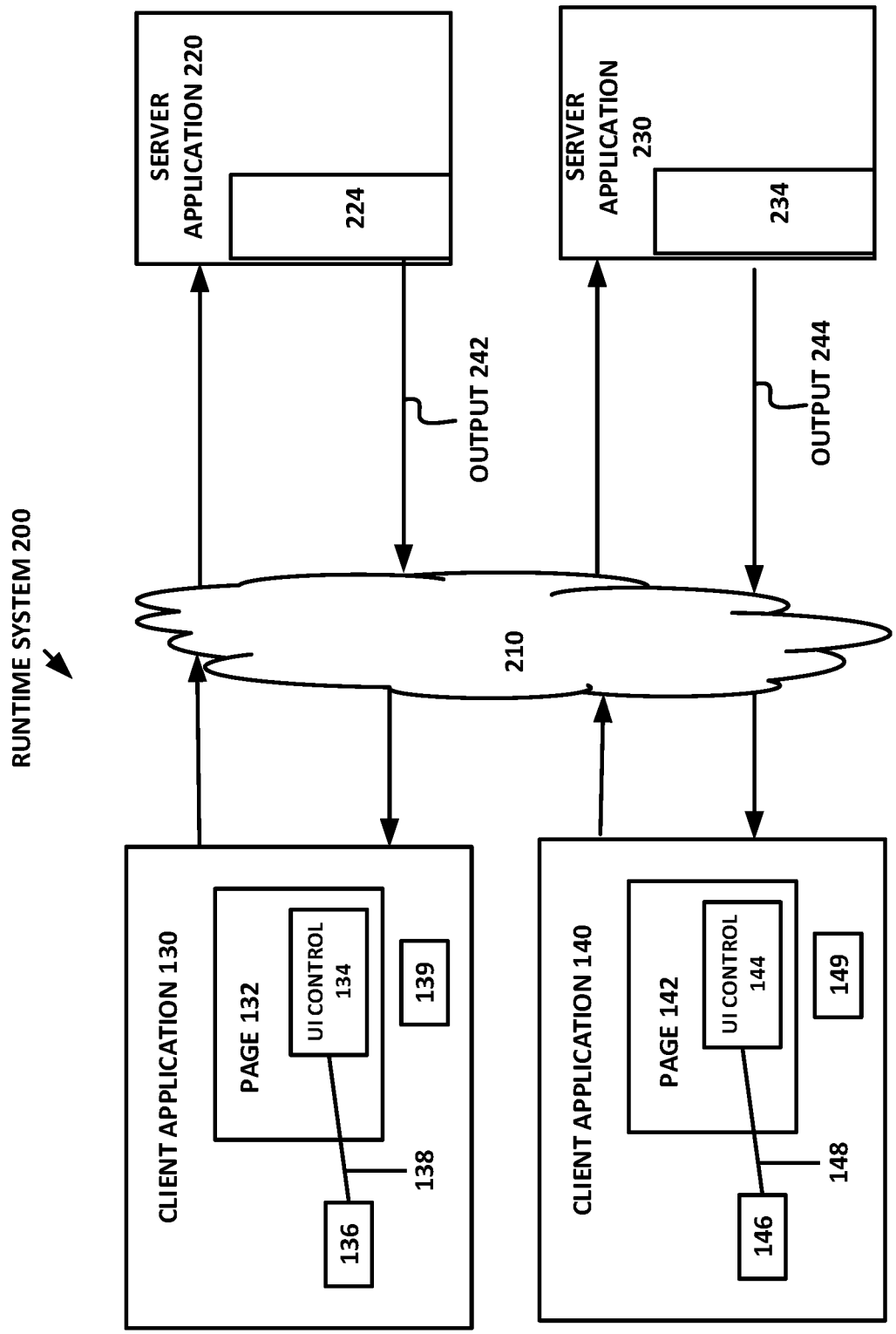

REST TRANSFORMATION

CROSS REFERENCES TO RELATED APPLICATIONS

This application claims the benefit of U.S. Provisional Patent Application Ser. No. 62/564,954, entitled REST TRANSFORMATION, filed on Sep. 28, 2017 and U.S. Provisional Patent Application Ser. No. 62/629,531, entitled REST TRANSFORMATION, filed on Feb. 12, 2018, which are hereby incorporated by reference as if set forth in full in this application for all purposes.

BACKGROUND

Different companies that provide the same types of products use different interfaces for providing online services related to those products. For example, Barnes & Noble® and Borders® both sell books but the interfaces for their online services are different making it difficult for third party developers to create client applications communicating with their online services. In the past, two different approaches were used. In one conventional approach, developers wrote code to directly communicate with each online services' interfaces. In another conventional approach, developers would directly assign data variables from the online service into data variables for their client applications. Both of the conventional approaches require significant amounts of sophistication on the part of the developers, are time consuming, and are error prone.

SUMMARY

An embodiment provides for representation state transfer (REST) transformation. A service abstraction is received. Service templates are received. Each service template corresponds to a different one of a plurality of services. Service specific requests are provided by modifying the service templates based on the service abstraction. Each of the service specific requests are different from each other and are for a different one of the services.

An embodiment provides a non-transitory processor-readable storage device including instructions for a method of providing REST transformation, the method comprising: receiving a service abstraction; receiving service templates, wherein each service template corresponds to a different one of a plurality of services; and providing service specific requests by modifying the service templates based on the service abstraction, wherein each of the service specific requests are different from each other and are for a different one of the services.

A further understanding of the nature and the advantages of particular embodiments disclosed herein may be realized by reference of the remaining portions of the specification and the attached drawings.

BRIEF DESCRIPTION OF THE DRAWINGS

FIG. 2 depicts a block diagram of a run time system, according to one embodiment.

DETAILED DESCRIPTION OF EMBODIMENTS

In contrast to conventional approaches, embodiments identify the common denominator (also referred to as "service abstraction") between the online services' interfaces. For example, although the interfaces and the data may be considerably different between the online services, it has been observed, that various online services have common ways of handling pagination, filtering, sorting, etc. The common denominators for pagination, filtering, sorting, and so on are each identified. A design time tool enables modification of templates that are specific to each the company's online services (also referred to as "service specific templates") based on values associated with the common denominator to provide service specific requests. The common denominators in combination with the service specific templates provide a level of indirection generating computer executable instructions for the client application's interface for communicating with the online service. Further, unsophisticated developers can use the design time tool to generate computer instructions for their client applications.

According to one embodiment, a service layer can present a common interface for client code for pagination, filtering, and sorting, while providing a generic implementation to transform that interface to the implementation and format of a particular service.

Application Programming Interfaces (APIs) handle common things like paging, sorting, filtering, etc differently because they were designed by different people. For example, the following two are both ways to filter data yet they are different from each other:

http://service-one.com?filter=nameEQUALSbob
http://service-one.com?name=bob&nameOp=EQUALS Generally speaking, if a service supports a way of filtering, paging, sorting, etc for one particular REST endpoint, it supports that way for all of its REST endpoints.

In order to provide good tooling for processing, such as filtering, paging, and sorting, some consistent manner of configuring each of these is provided within the tool. Then, at a service level, an embodiment enables transforming that tooling representation into what is actually used by the service.

Figure 1A:
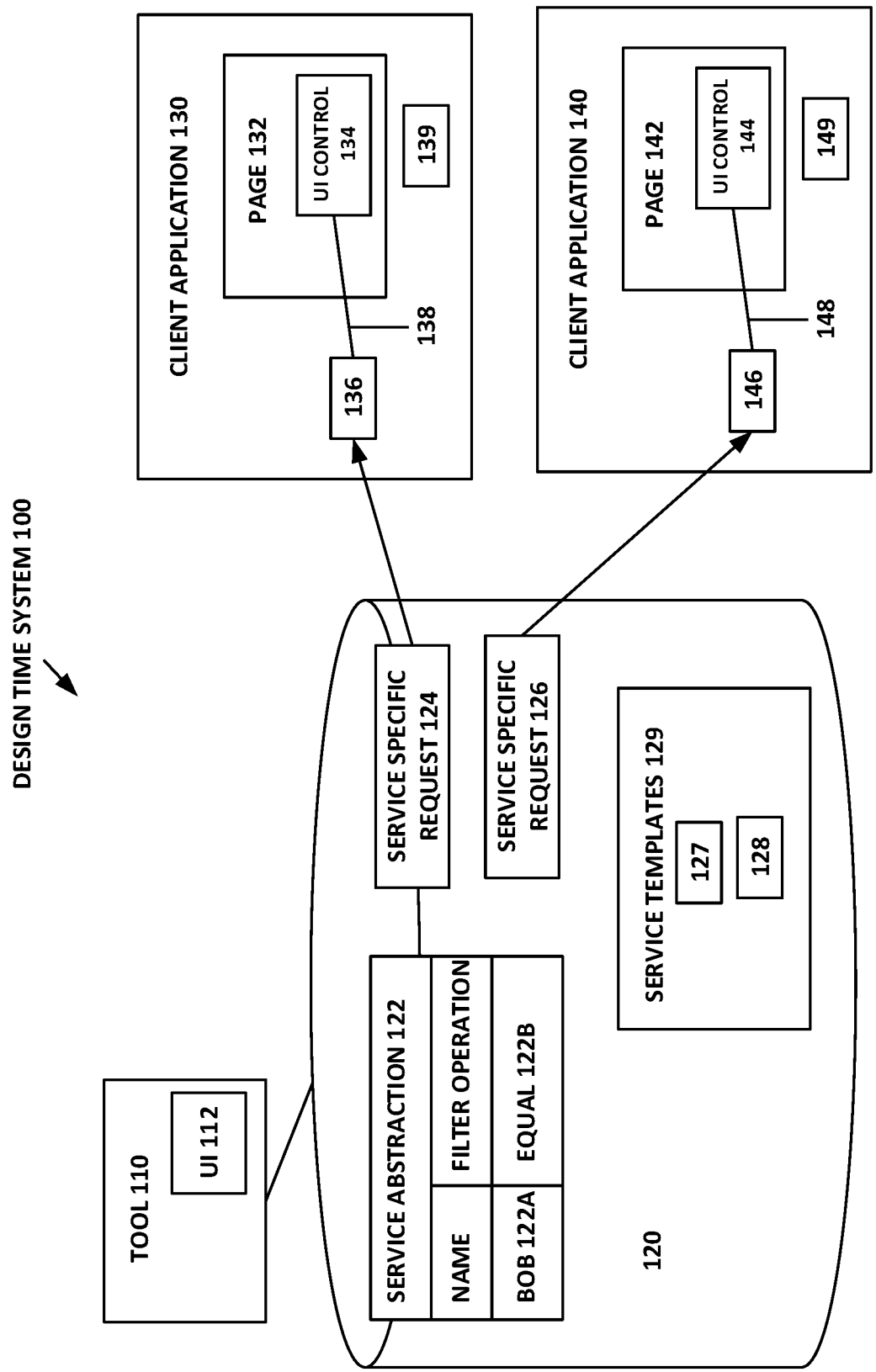
FIG. 1A depicts a block diagram of a design time system, according to one embodiment.

FIG. 1A depicts block diagrams of a design time system 100, according to one embodiment. The tool 110 and the client applications 130, 140 can reside on one or more computers. The client applications 130, 140, according to one embodiment, can reside on memory 120. The memory 120 can reside in a networking environment of respective companies that developed the client applications 130, 140. In another embodiment, the memory 120 can be on the cloud in a data facility where the respective companies, for example, pay another party for storing the client applications 130, 140. Memory 120 may represent one storage device or a plurality of storage devices.

The design time system 100 includes a tool 110, hardware memory 120, a client application 130, and a client application 140. The tool 110 communicates with the hardware memory 120 and with the client applications 130, 140. The communications can be through one or more networks.

The user interface 112 of the tool 110 can be used to specify service templates 129. In this illustration assume that the specific service template 127 includes "HTTP://service-one.com?filter.name" and the service specific template 128 includes "HTTP://service-one.com?name=&nameOP"

In this illustration, the service abstraction 122 pertains to filtering and includes parameters for name and a type of filter operation. Values 122A and 122B have been associated with each of the parameters. The value of the name parameter in this illustration is bob 122A and the value of the filter operation parameter in this illustration is equal 122B.

Figure 1B:
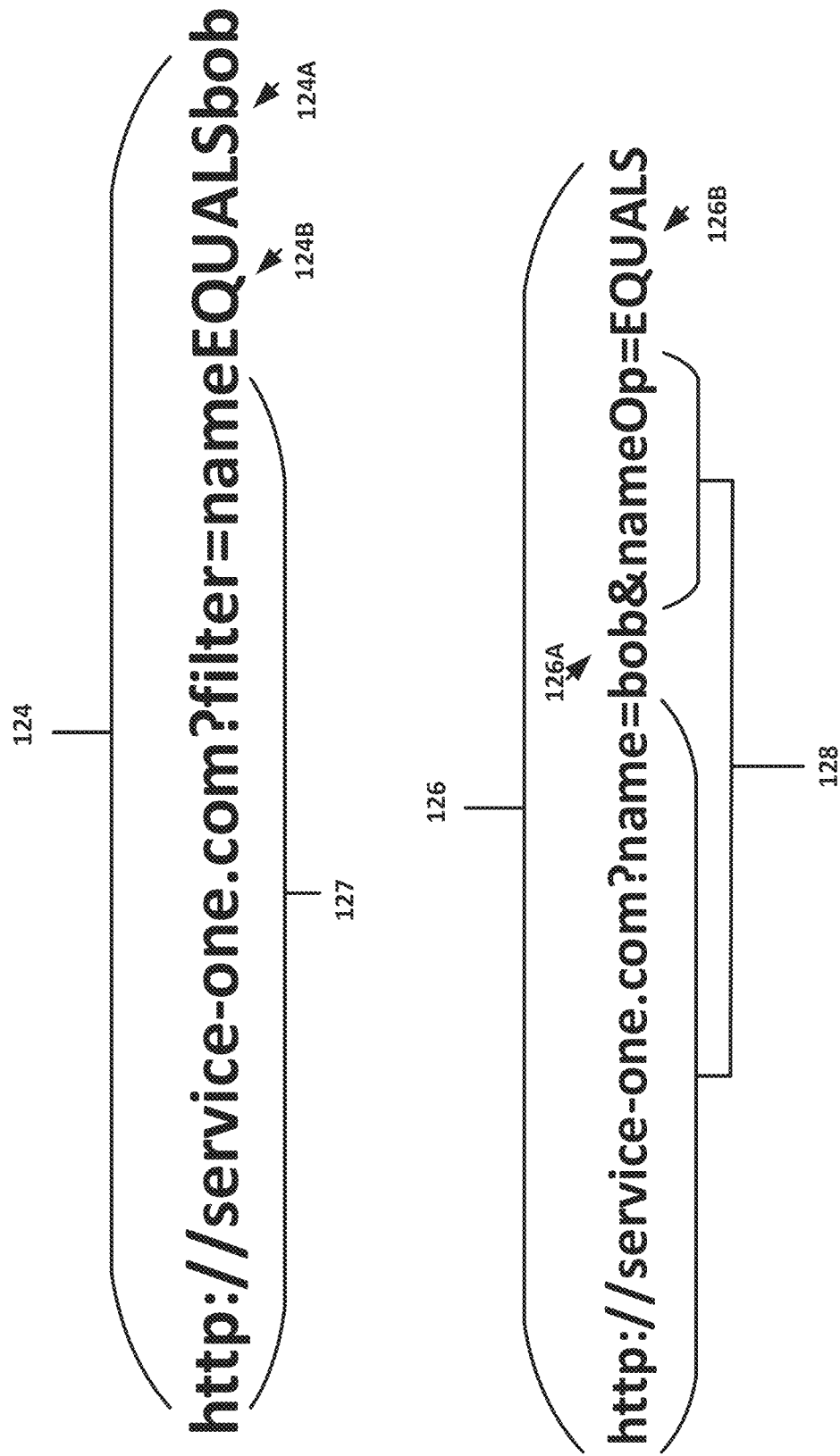
FIG. 1B depicts service specific requests, according to one embodiment.

FIG. 1B depicts service specific requests 124, 126, according to one embodiment, that are discussed in the context of the design time system 100.

Referring to FIGS. 1A and 1B, according to one embodiment, the client applications 130, 140 are executed by and/or in the tool 110. In this case, the web pages 132, 142 are displayed by browsers in a client computing device that communicates with the computing device executing the tool 110.

The user interface 112 can also be used to specify mappings between parameters values 122A, 122B of a service abstraction 122 in FIG. 1A to locations 124A, 124B, 126A, 126B in FIG. 1B of respective service templates 127, 128 to create service specific requests 124, 126. Parameter value 122A can be copied into location 124A of template 127 and into location 126A of template 128. Further, parameter value 122B can be used to modify template 127 at location 124B with "EQUALS" and modify template 128 at location 126B with "EQUALS."

The modification or the partial modification of a service template based on the values associated with a service abstraction is referred to as "transformation." The user interface 112 can be used to create transformation code that modifies or partially modifies a service template based values associated with a service abstraction, as discussed herein. The user interface 112 can provide one or more data entry windows for a developer to enter the transformation code. The transformation code can be stored in memory 120.

Referring to FIG. 1A, the user interface 112 can associate a service specific request 124, 126 with a particular client application 130, 140. For example, 136 can be a copy of service specific request 124 and 146 can be a copy of service specific request 126.

The user interface 112 can be used to specify an association 138, 148 between a user interface control 134, 144 of a web service that provides a user interface, such as a page 132 or document, of a client application 130, 140 and a service specific request 136, 146 (also referred to as a "service specific request copy"). A user interface control 134, 144 can be any type of mechanism that enables a user to specify information that causes a user interface to perform an action. Examples of user interface controls include, among others, data entry fields, windows that can receive entered data, menus or lists that a user can select an item from, drop down menus, radio buttons, and tabs.

FIG. 2 depicts a block diagram of a runtime system 200, according to one embodiment. Assume for the sake of illustration that the server applications 220, 230 belong to different companies. For example, one of the server applications may belong to Barnes and Noble® and the other server application may belong to Borders®.

The client applications 130, 140 depicted in FIG. 1B may be the same or copies of the client applications 130, 140 depicted in FIG. 1A. For example, a client application 130 may be developed on a computing device A and then a copy of that developed client application 130 can be executed on the same computing device A or a different computing device B.

In response to a user selecting a user control 134, 144, the respective association 138, 148 is used to obtain the corresponding service specific request 136, 146. For example, if a user selects user control 134, the association 138 is used to obtain the service specific request 136. The service specific request 136 is communicated to the end point 224 of the server application 220 via the internet 210. The server application 220 performs processing to satisfy the service specific request 136. The end point 224 provides the output 242 of that processing to the client application 130 via the Internet 210.

In a similar manner, the service specific request 146 can be communicated to the end point 234 of the server application 230 via the internet 210 in response to a user selecting the user interface control 144. The server application 230 performs processing to satisfy the service specific request 146. The end point 234 provides the output 244 of that processing to the client application 140 via the Internet 210.

One or more of the values 122A, 122B can be provided by a client application 130, 140 during runtime. For example, a page 132, 142 may provide a data entry field for name. The user can enter the name "bob" into that data entry field. Then the appropriate template 127, 128 can be modified to include name bob at the location 124A, 126A. In this case, 136, 146 would include a template 127, 128 or a partially modified template. The modification or partial modification of a service template based on a service abstraction is referred to as "transformation." The transformation or a partial transformation of the template at 136, 146 can be performed by transformation code provided by the tool 110. That transformation code may reside and execute in the tool 110 or the tool 110 may provide transformation code to the client application 130, 140 where it is executed. The tool 110 may also provide one or more service abstractions, the one or more values associated with the service abstractions, and/or one or more service templates to the client application 130, 140 for the purposes of executing the transformation code at the client application 130, 140.

More than one set of values may be associated with a service abstraction 122. For example, a row of values may be associated with each of the different server applications for the companies. More specifically, row 1 for company A may include "equal," row 2 for company B may include "eq," and row 3 for company C may include the value "=."

The tool 110 can also provide code 139, 149 to each of the client applications 130, 140 to transform the respective outputs 242, 244 into a common format. More specifically, the code 139, 149 can transform the outputs 242, 244 into the same format making it easier for one or more developers to create client applications that communicate with different server applications.

In a similar manner, a service abstraction can be used for sorting. For example, one of the templates may include "?sort="name"&up=" The sort service abstraction may have parameters for a name and sort operation criteria. Assume for the sake of illustration, that the name is bob and the sort operation criteria can be set to ascending or descending. The transformation can modify the template into "?sort="bob"&up=yes" based on the values associated with the sort service abstraction's parameters.

One or more developers can specify the service templates, the mappings to modify the templates to create service specific requests, the code 136, 146, and create the client applications. Those developers may work for the same or different companies. Further, the tool may be one tool or it may be more than one tool. One or more user interfaces can also be provided by the tool that are used by one or more developers. In one illustration, a developer or team of developers working for company X create the service abstractions, service templates, the code that transforms the templates into the service specific requests based on the service abstractions, and write the code 139, 149 that provides the common formats.

Another developer or team of developers working for a different company Y use the tool to create the client application 130. For example, the developers may interact with a user interface of the tool 110 to obtain one or more of 136, 139, transformation code, one or more service abstractions 122, service template 127, 128 from the tool 110 for the client application 130. The tool or tools can provide visual application building capabilities that the developer or team use via the cloud to obtain these types of information from the tool 110 for the client application 130. Visual Builder Cloud Service (VBCS) is modified to provide various visual application building capability embodiments discussed herein. Yet another developer or team of developers working for company Z create the client application 140 in a similar manner.

The tool enables a first developer to spend a small amount of time, such as a few hours, to read the documents of the companies that own the server applications, to create the service abstraction 122, the service templates 129, transformation code for transforming the service template into a service specific request based on the service abstraction, and code 139, 149 for providing a common output format. The developers of the client applications can then leverage the effort of the first developer. More specifically, thousands of developers can work on writing client applications using the minimal transformation activities of the first developer.

The pages 132, 142 can belong to the same or different client applications. For example, the same or different client applications can be used to communicate with the server applications 220, 230 associated with different companies. The user interface controls 134, 144 can be associated with the same or different pages or documents. The same user interface control can be used for both 134, 144. If the same user interface control is used for requests 136, 146, then another parameter specified in the client application can be used for specifying which server application the user interface control will communicate with.

The example depicted in FIG. 1B pertains to filtering, according to one embodiment. The service abstraction 122 for filtering includes a name and a filtering operation.

Book stores' server applications may provide interfaces for the following:

Get all books—returns an array of books
Get a book—returns a book
Get all authors—returns an array of authors
Get all illustrators—returns an array of illustrators Although each of the book stores may provide their respective interfaces for each of the above, the formats for each of the service specific requests and the format of each of the outputs is different.

One company A's service specific request may have syntax such as "books page: 2" whereas another company B's service specific request may have the syntax "books/2."

However, there will be similarities in how both companies A and B handle their data with respect to how to obtain more information, such as pagination or the next page, how to filter the data, and how to sort the data, among other things.

The following is an illustration for pagination: Assume in this illustration that the payload of an output 242, 244 is as follows:

```
/books
    {
        Books[ ]
        TotalCount= 12000
        Page=1
        Token=**1
    }
```

Page=will be set to 1 in the payload for the first page. Page=will be set to 2 in the payload for the second page, and so on.

Also assume that the service abstraction 122 for pagination (also referred to as "pagination service abstraction") is as follows:

HasMoreData
TotalItems
OtherStuff

HasMoreData could be a boolean that is set to yes if there is more data or no if there is no more data. Alternatively, HasMoreData could be a value that specifies how much more data is to come. TotalItems specifies the total number of items and can be used to determine when to stop fetching.

The OtherStuff parameter can be set to the value of the page parameter in the payload, thus, providing coordination between the client applications and the server applications. More specifically, if the page=parameter in the payload comes back with a 1, indicating the payload is for the first page, then the service specific request can include a "/books/2" or "books page: 2" depending on which server application it will be communicated to.

From reading a company's documentation, the developer that uses the design time system 100 can determine how to implement the tool 110 to create the service templates 129, the service specific requests 124, 126, the transformation of the service templates into the service specific request based on the service abstraction, and the code 136, 146.

For example, the developer may read in company A's documentation that they return 25 books in each payload and that each payload is associated with a page. The tool 110 can perform a transformation to multiply the page by 25 to determine whether they have reached the TotalItemCount. They can set HasMoreData to No if they have reached the value specified in TotalItems and they can set HasMoreData to yes if they have not reached the value specified in TotalItems. Alternatively, the developer could set HasMoreData to the value of the remaining books that have not yet been fetched by multiplying the value of the page parameter by 25 and subtracting that from the value of TotalCount.

Embodiments are also well suited for implementing scrolling instead of separate pages.

The following is an illustration of an enterprise service. In this illustration, the enterprise service is a type of organization chart known as an aria chart.

The following is an example of a payload for output 242 or 244 from a particular company:

```
/aria/directs/<id>
{
    {
        An array of employees
    }
}
```

The following is an example of a service specific request for all of the direct reports for a person named Kim K: /aria/Kim.K?expand=direct.

In the above example, the template 129 "/aria/ . . . ?expand= . . . " has been modified with the service abstraction parameters Kim.K and direct.

The following is an example of a common format that code 139, 149 can provide:

```
{
    Id
    FirstName
    LastName
    Email
    Salary
    Directs: [...]
}
```

The array of employees from the output 242 or 244 can be copied into the array of Directs in the common format. The common format can also be used as a data structure for tracking enterprise service information. For example, the first name, the last name, the email address, and the salary can frequently be obtained from public records. The ID in the common format and in the payload may be an employee identification for Kim K.

The common format can be stored on memory 120.

The employee array in the output 242 or 244 and the directs in the common format can be a nested data structures. For example, Cheryl E may report to Kim K and Alley A and Isaac B may report to Cheryl E.

Although many of the illustration provided herein refer to REST HTTP, embodiments are well suited to other types of implementations.

Service abstraction 122, service templates 129, service specific requests 124, 126, common format, values for the common format, and output, among others are examples of data structures that can be stored in hardware memory, according to various embodiments.

The tool 110 generates computer executable instructions, during design time, that implements the client applications 130, 140 in response to information a developer enters into web pages of the user interface 112. The design time user interface 112 provides various web pages that the developer can enter information to instruct the tool 110 on how to generate the computer executable instructions for the client applications 130, 140. The generated computer instructions implement 136, 146, 138, 148, 139, 149, 132, 134, 142, 144, among others. The generated computer executable instructions of client applications 130, 140 are then executed during runtime.

Figure 3:
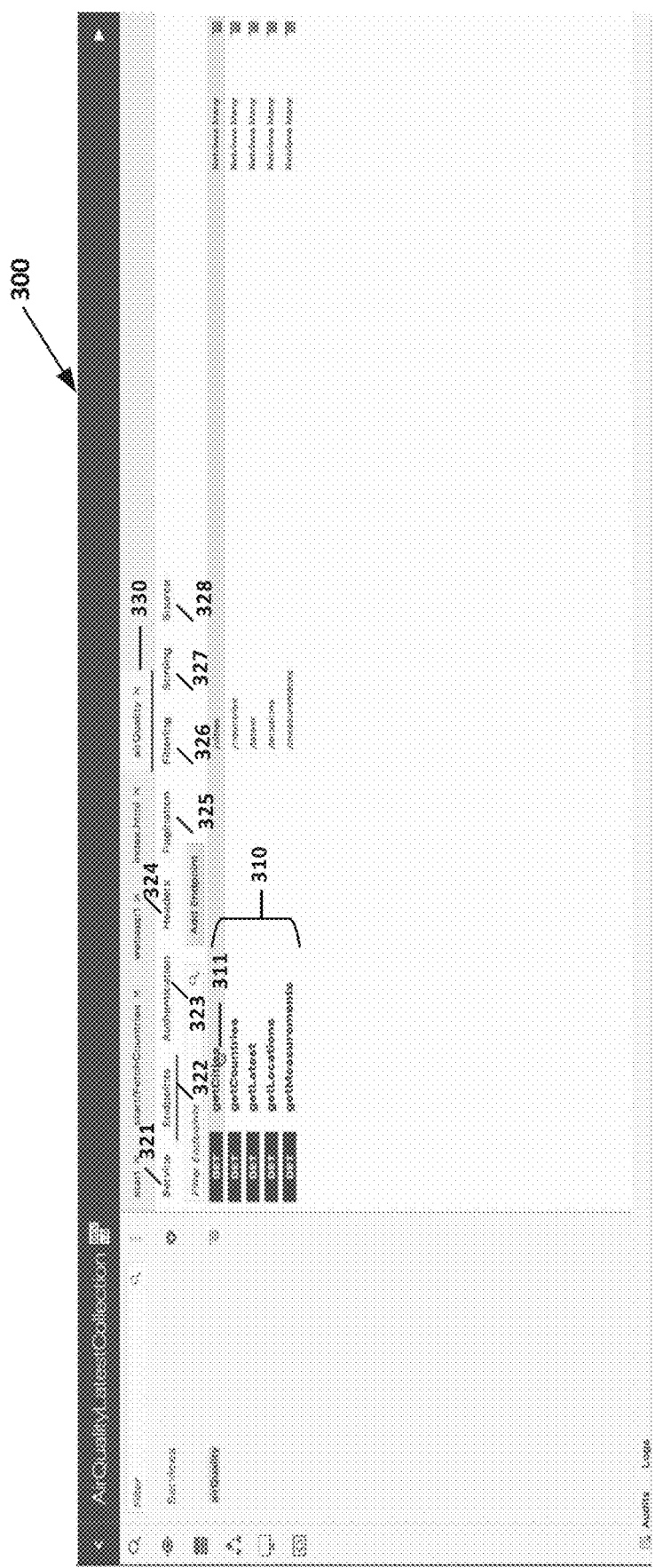
FIG. 3 depicts a web page 300 of the user interface 112 that displays a list 310 of end points, according to one embodiment.

FIG. 3 depicts a web page 300 of the user interface 112 that displays a list 310 of end points, according to one embodiment. The developer can specify a particular end point 224, 234 by selecting one of the end points in the displayed list 310. The list 310 enables a user to select end points for getCities, getCounties, getLatest, getLocations, and getMeasurements. Embodiments are well suited for other types of end points for other types of applications, such as financial or medical. As depicted, the developer has selected "getCities" end point 311. The web page 300 also provides tabs 321-328 for displaying web pages for service, endpoints, authentication, header, pagination, filtering, sorting, source, and so on. This web page 300 that displays the list 310 of end points was displayed in response to the developer selecting the endpoints tab 322 under "airQuality" tab 330.

Figure 4:
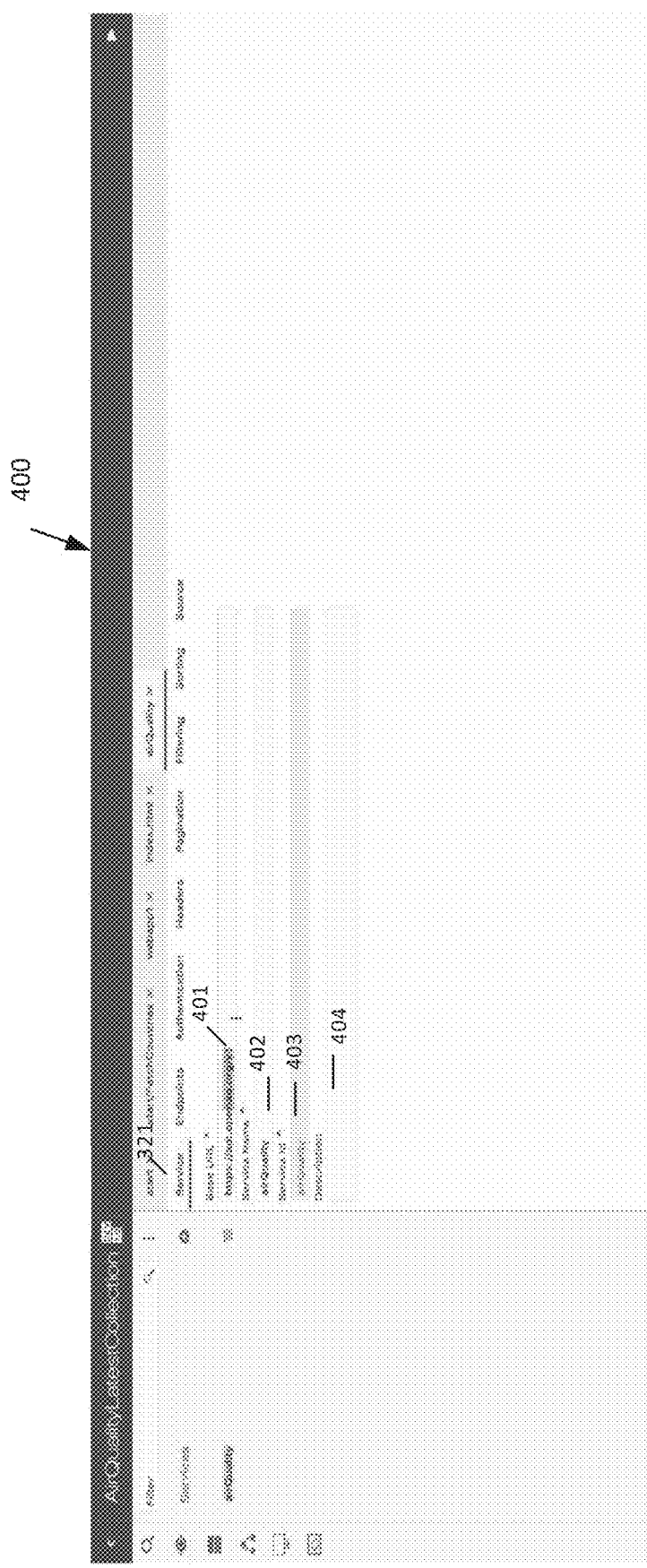
FIG. 4 depicts a web page 400 that is displayed in response to a developer selecting the service tab 321 in the previous web page 300 depicted in FIG. 3, according to one embodiment.

FIG. 4 depicts a web page 400 that is displayed in response to a developer selecting the service tab 321 in the previous web page 300 depicted in FIG. 3, according to one embodiment. The web page 400 of the user interface 112 enables the developer to specify a base URL 401 that is used as a service template 129. This web page 400 allows the developer to enter a service name 402, a service identifier (ID) 403, and a description 404 for the end point. The web page 400 also provides tabs 321-328 for displaying web pages, as discussed herein.

Figure 5:
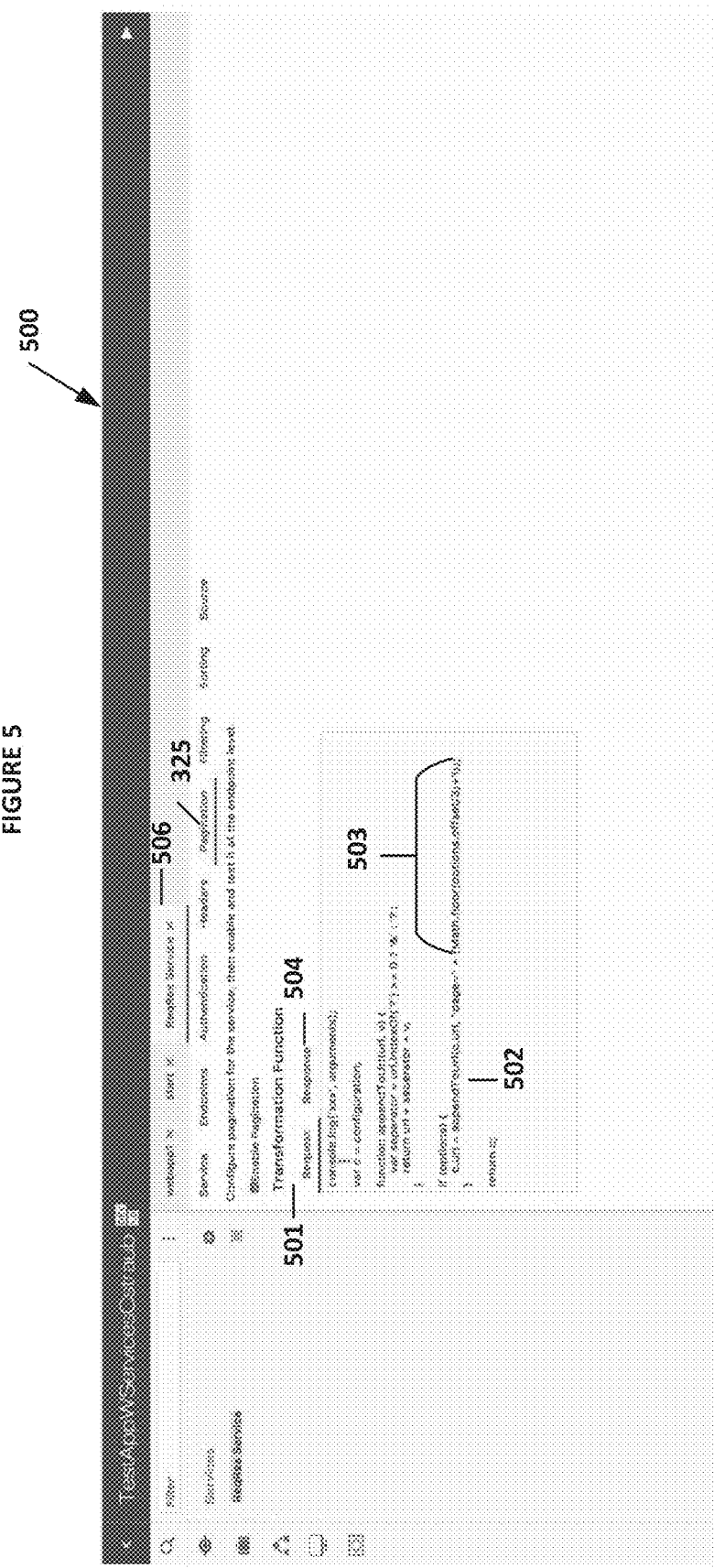
FIG. 5 depicts a web page 500 that is displayed in response to the developer selecting the pagination tab 325 from the web page 400 (FIG. 4), according to one embodiment.

FIG. 5 depicts a web page 500 that is displayed in response to the developer selecting the pagination tab 325 from the web page 400 (FIG. 4), according to one embodiment. The web page 500 can be displayed in response to selecting the pagination tab 325 and the request response tab (also referred to as "ReqRes Service") 506. The web page 500 of the user interface 112 that enables a developer to configure pagination for a particular end point. In this illustration, the end point is "getCities." The web page 500 has tabs 501 and 504 for specifying request information for the end point and response information for the end point.

As depicted below, the request tab 501 has been selected. The request information is a pagination function for the specified end point "getCities." The function specifies an appendToURL 502 that transforms a service template 129 into a service specific request 124, 126. In the example below, the appendToURL specifies logic 503 "Math.floor (options.offset/3)+1" for determining what the next page is to request. In this illustration, assume that the number of records per page is 3. Therefore, the specified logic divides by 3 and adds 1 for rounding errors to determine the number of the next page. In another example, the next page could be determined by adding 1 to a variable that provides the value of the current page. The input to this webpage is also referred to as a "pagination request modification."

The web page 500 also provides tabs 321-328 for displaying web pages for service, endpoints, authentication, header, pagination, filtering, sorting, source, and so on.

Figure 6:
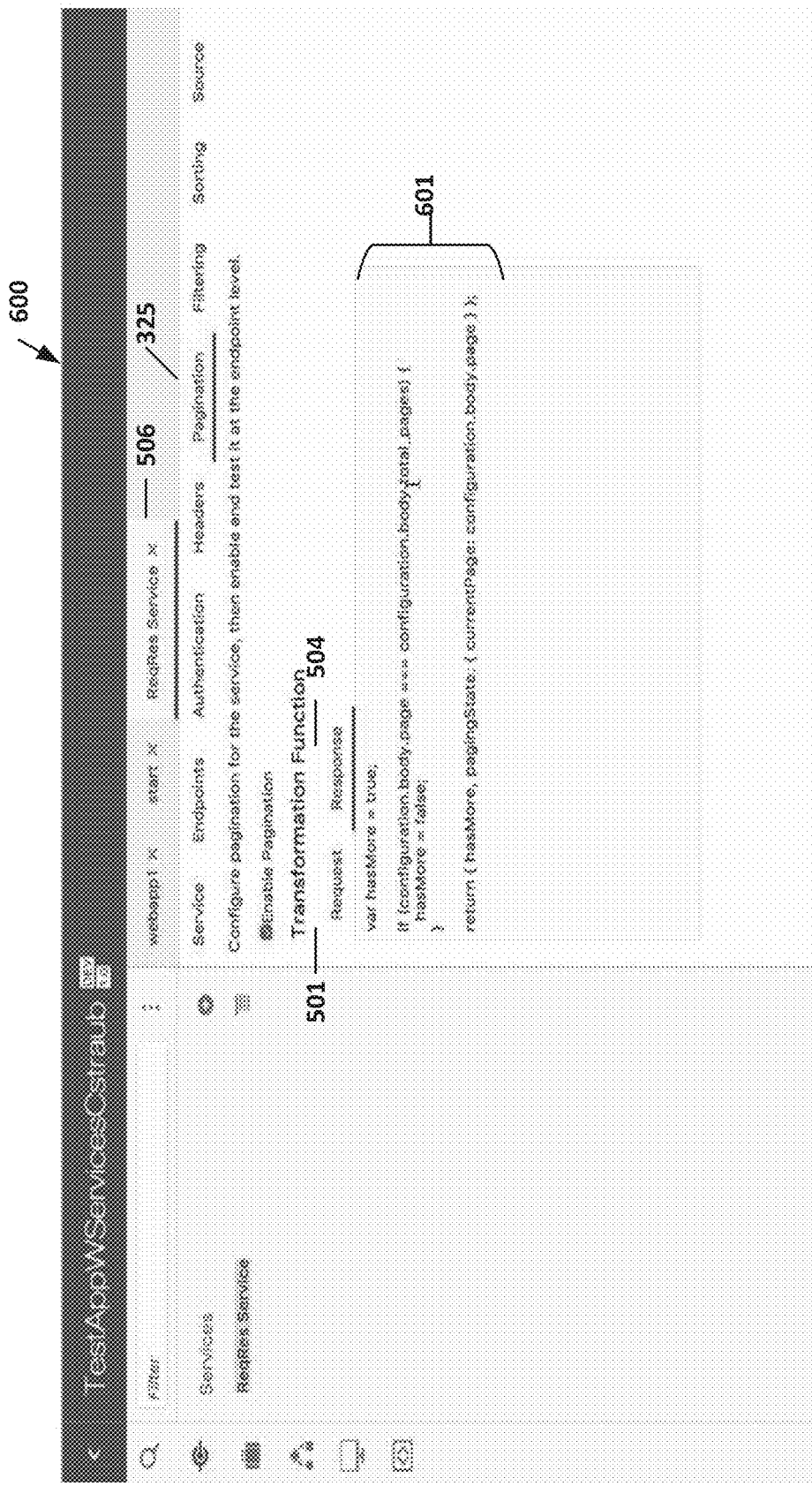
FIG. 6 depicts a web page 600 that is displayed in response to the developer selecting the response tab 504 of web page 500 (FIG. 5), according to one embodiment.

FIG. 6 depicts a web page 600 that is displayed in response to the developer selecting the response tab 504 of web page 500 (FIG. 5), according to one embodiment. As discussed herein, at runtime, the client applications 130, 140 transmit the service specific requests 124, 126 to the respective end points 224, 234. The service applications 220, 230 for those end points, processing the service specific requests and provide output 242, 244. The developer can enter instructions into the web page 600 for handling the output (also referred to as a "response") from the selected end point. As depicted, the developer has specified determining whether the response has more data in order to determine whether another REST call should be made to obtain more information for pagination. The web page also provides tabs 321-328 for displaying web pages, as discussed herein.

Figure 7:
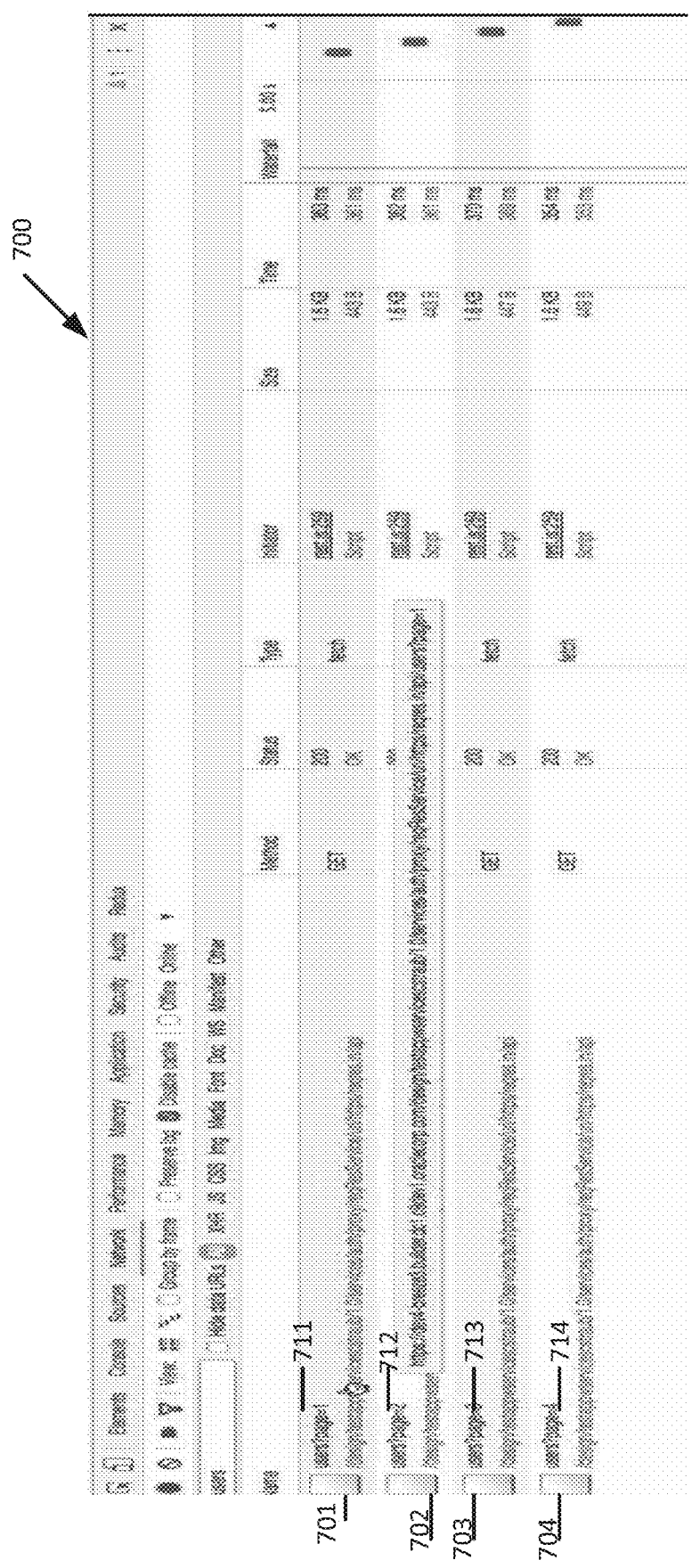
FIG. 7 depicts an example of log records 700 for the four transformed REST calls 701-704 that specify sequential page numbers at 711-714, according to one embodiment.

Assuming that the output has 12 records with 3 records per page. In this case, four transformed REST calls would be made from a client application to a specified end point. FIG. 7 depicts an example of log records 700 for the four transformed REST calls 701-704 that specify sequential page numbers at 711-714, according to one embodiment. As can be seen, the requested page number is incremented in each successive transformed REST call. More specifically, the first REST call 701 specifies page 1 at 711; the second REST call 702 specifies page 2 at 712 and so on. The base URL 401 (also known as the "service template"), depicted in FIG. 4, is the same for all four REST calls 701-704. The transformation function is adding the "page=1", "page=2", "page=3", and so on to the base URL 401 that was specified under the service tab 321 (FIG. 4), as discussed herein. The incrementing of the requested page number is provided in response to the service specific request generated based on the developer input for the base URL and the pagination request modification.

Figure 8:
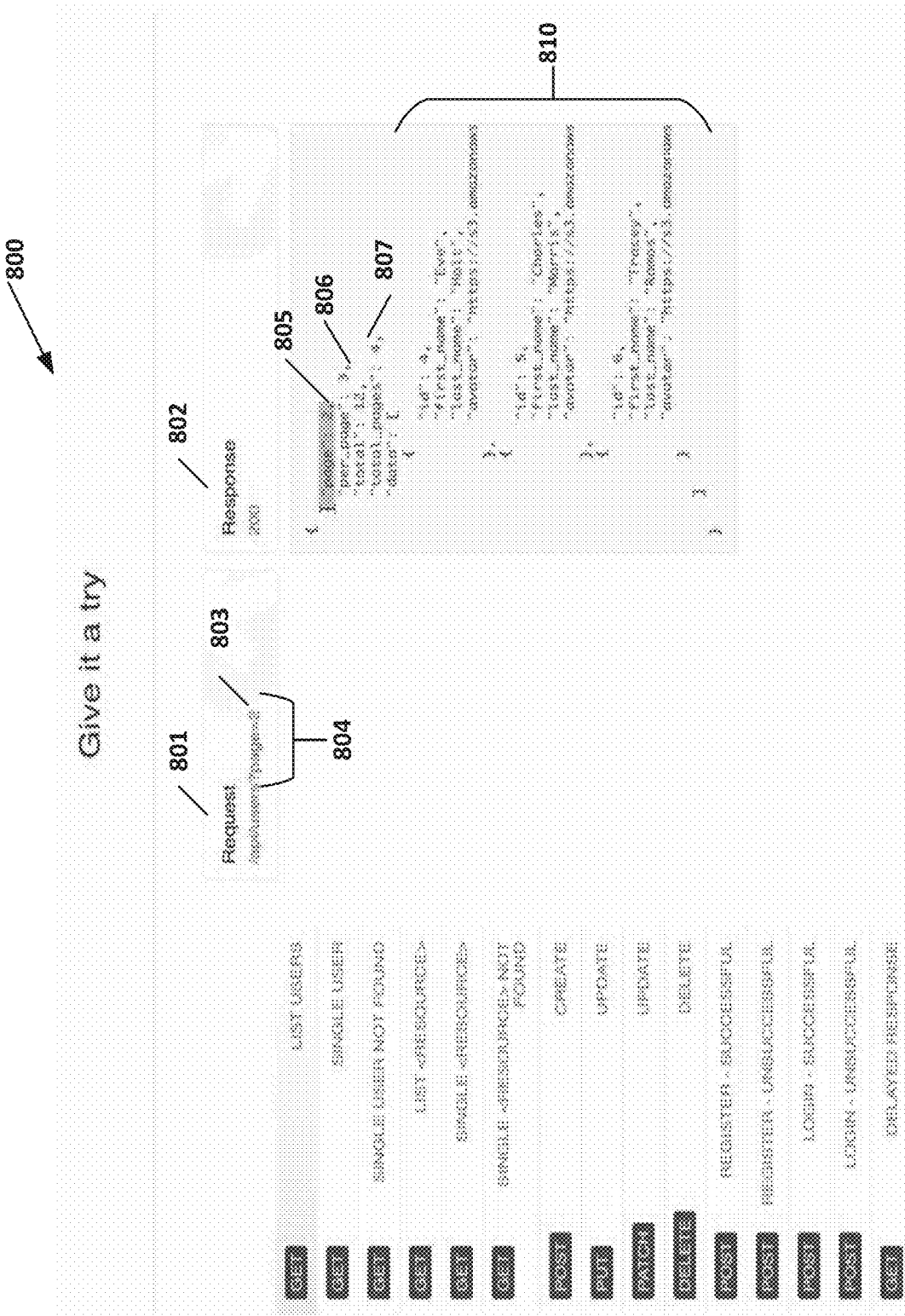
FIG. 8 depicts a web page 800 of the user interface 112 that enables a developer to try out REST transformation, according to one embodiment.

FIG. 8 depicts a web page 800 of the user interface 112 that enables a developer to try out REST transformation, according to one embodiment. The web page 800 provides a request portion 801 and a response portion 802. The developer can request a particular page by changing the number 803 that appears after the "page=" parameter 804 in the request portion 801. In response to requesting page=2, the response portion 802 indicates at 805 that page 2 is provided, at 806 that there are 3 records per page, at 807 the total number of pages is 4, and at 810 the data for the requested page 2. By changing the request to page=3 at 803, the developer can request and obtain the third page.

Figure 9:
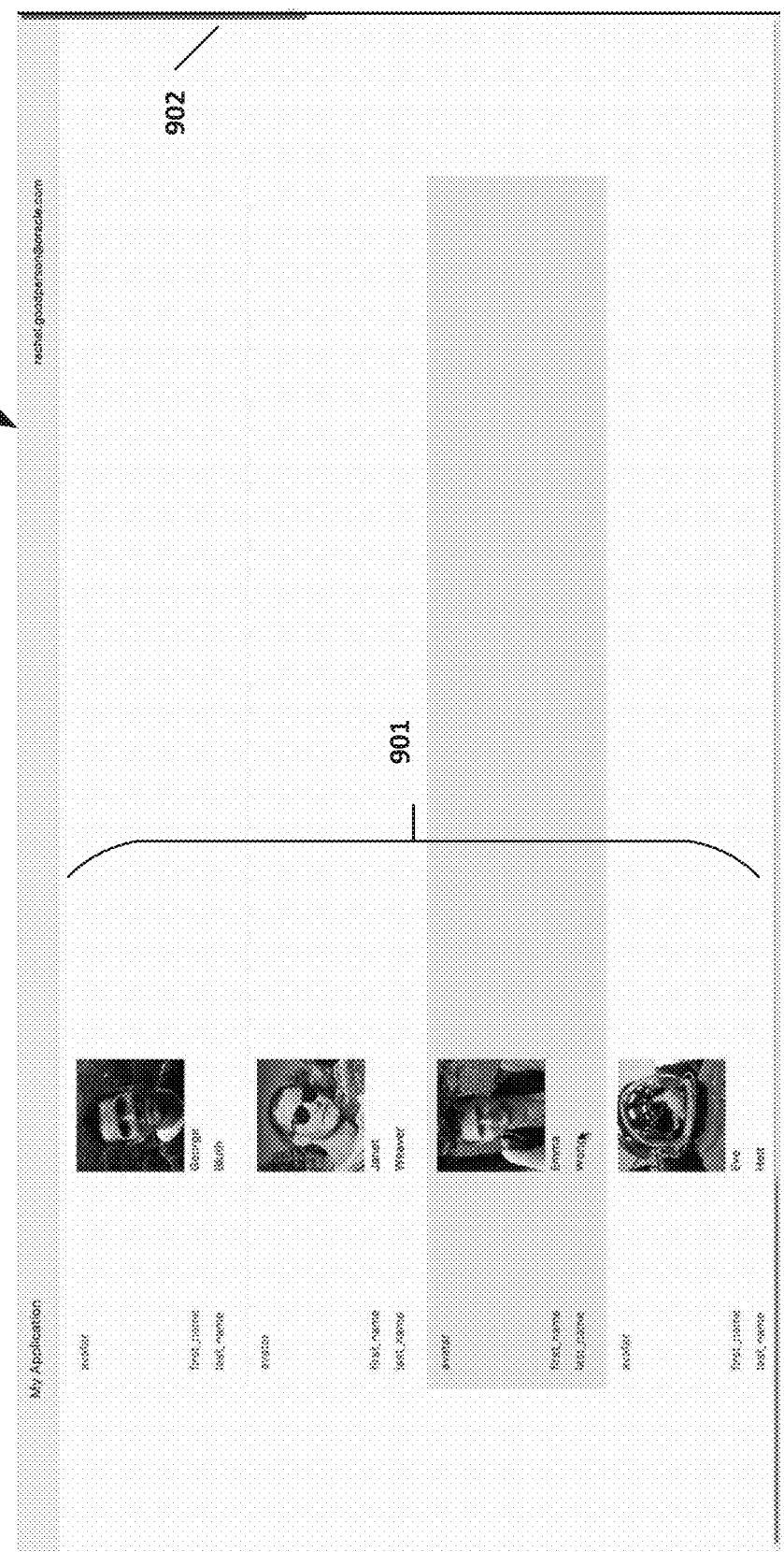
FIG. 9 depicts a page 900 that is displayed by a client application 130, 140's user interface based on the output 242, 244, according to one embodiment.

FIG. 9 depicts a page 900 that is displayed by a client application 130, 140's user interface based on the output 242, 244, according to one embodiment. For example, during runtime, the client application's user interface can display a page 900 with information from the response's output 242, 244. As depicted in this illustration, the page 900 can provide scrolling capabilities using a scroll bar 902. In response to the user scrolling, transformed REST calls, as represented in log records 701-704, are generated and transmitted to the appropriate end point 244, 234 and the output 242, 244 can be transformed, as discussed herein.

Figure 10:
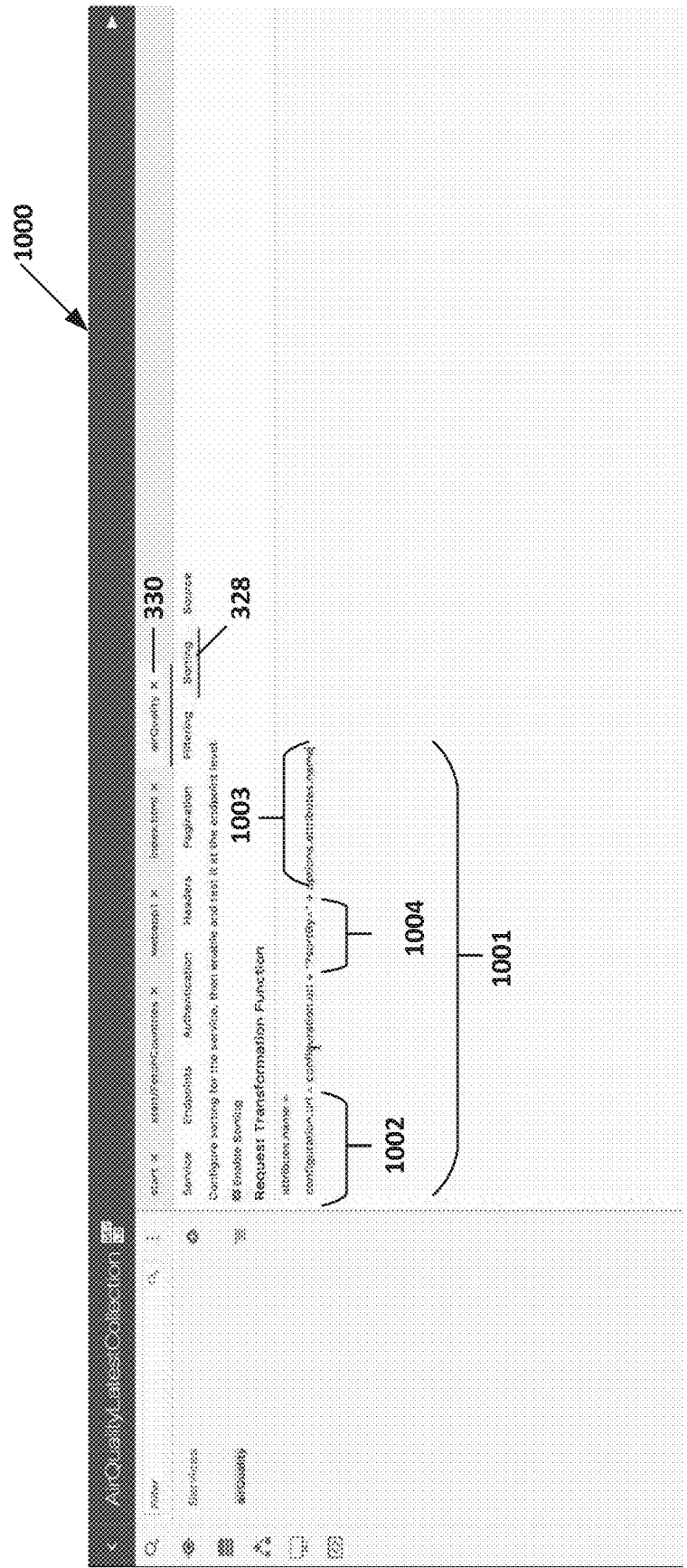
FIG. 10 depicts a web page 1000 of the tool 110's user interface 112 for specifying how to transform the service template for sort, according to one embodiment.

FIG. 10 depicts a web page 1000 of the tool 110's user interface 112 for specifying how to transform the service template for sort, according to one embodiment. The web page 1000 is displayed by selecting the sorting tab 328 under the airQuality tab 330. In this illustration, the service template was specified using the service tab 321 (FIG. 3). Further in this illustration, the request transformation function 1001 is "configuration.url=configuration.url+"?sortBy="+options.attributes.name." The configuration.url variable 1002 provides the service template for the transformation function. The options.attributes.name 1003 provides sort parameters, such as up, down, ascending, or descending. The transformation adds "?sortBy=" 1004 and the sort parameters to the service template.

VBCS Application Building

Although various embodiments are described in the context of business applications, embodiments are well suited for other types of applications and for non-business types of applications.

Visual Builder Cloud Service (VBCS) provides simple business application creation for everyone. It provides a visual development environment for rapidly creating and hosting business applications from the developer's browser. It enables quick creation and publishing of a complete application without coding. No programming skills are required. It provides integrated access to various pre-populated facilities, such as Software as a Service (SaaS) catalogs and representation state transfer (REST) services, among others.

According to an embodiment, the user is enabled to build any use case by hand as declaratively as possible through a design time facility (DT). For common patterns, various embodiments enable the DT to automate a set of manual steps for productivity reasons, but the result would be as if the user had built it by hand using best practices. This automation becomes available (and richer) through the increased use of metadata on the application programming interface (API).

Illustration of a System

Figure 11:
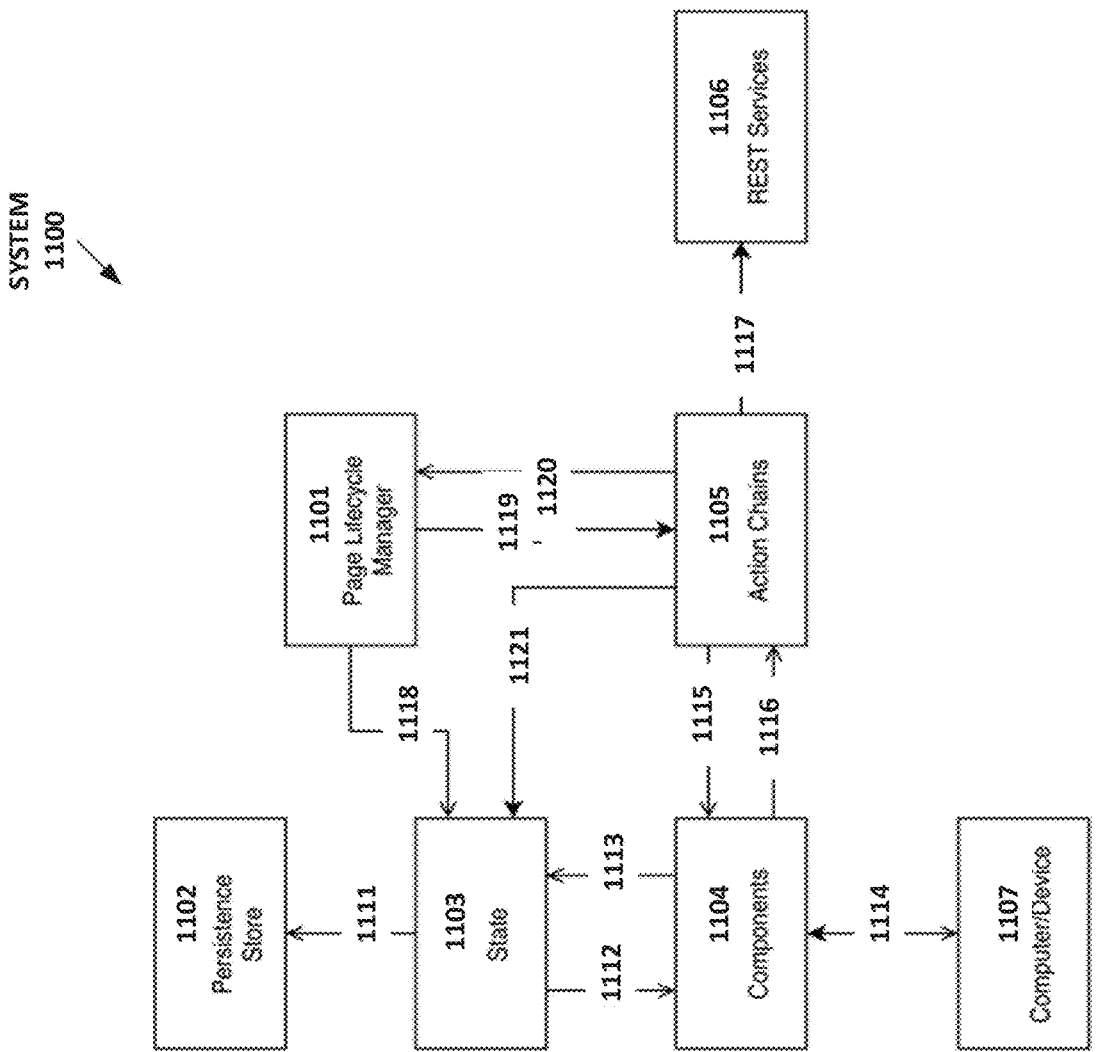
FIG. 11 depicts a system, according to one embodiment.

FIG. 11 depicts a system 1100, according to one embodiment.

The page lifecycle manager 1101 initializes and destroys parts of the state depending on which application UI is currently visible to the user. When it destroys state, it can save it to the persistence store (if configured) and when restoring state, it can load it from the persistence store.

Persistent Store 1102 is where application state is persisted (on disk) between invocations of the application by the user.

State 1103 provides the state in active use by the application (variables).

Components 1104 provides the UI that includes buttons, text, images, etc that the user interacts with.

Action Chains 1105 provides the core flow of logic that drives the application (the processes).

Rest Services 1106 provides external REST APIs.

Computer/Device 1107 provides the browser or device that is controlling the UI.

The following is a description of the flow of operations 1111-1121 with respect to the entities 1101-1107 depicted in system 1100:

Operation 1111: The persistence store is used to initialize and save state between when the user is actively using the application.

Operation 1112: State changes are reflected on components. For example, a text field bound to some state).

Operation 1113: State changes can be triggered by components. For example, a text input updating state directly.

Operation 1114: The user interacts with the UI from their device 1107.

Operation 1115: Action chains can call methods on the UI, such as telling a map to zoom.

Operation 1116: UI can fire action chains to perform logic (i.e. button click).

Operation 1117: Action chains are used to call REST services and to get data into and out of the system via those services.

Operation 1118: Page lifecycle manager initializes and destroys state as the user navigates the application and displayed different UI.

Operation 1119: Page lifecycle manager can fire action chains in response to navigation. For example, the user interacting with the device 1107 can cause a page to be entered and this can fire an action chain to do work in response to that.

Operation 1120: Action chains can cause navigation, such as activating different parts of the UI.

Operation 1121: Action chains 1105 communicates with state 1103.

According to one embodiment, the user interface created by the system 1100 can be executed in the browser of a client computer/device 1107. The client computer/device that the created user interface executes may be the same client computer/device 1107 that was used to create the user interface or a different client computer/device. The created user interface can be executed on multiple client computer/devices at different times or simultaneously.

As discussed herein, a design time tool is used for creating the user interface. According to one embodiment, the JSON files are created as part of creating the user interface. The JSON files are transported to the browser of a client computer/device using a well known method of communication and interpreted by runtime for execution.

With respect to REST Transformation the execution flow, according to one embodiment is:

A rest call is made from an action within the action chain (1105) through 1117. The rest transformation occurs in the 1105 box.

Illustration of a Method

Figure 12:
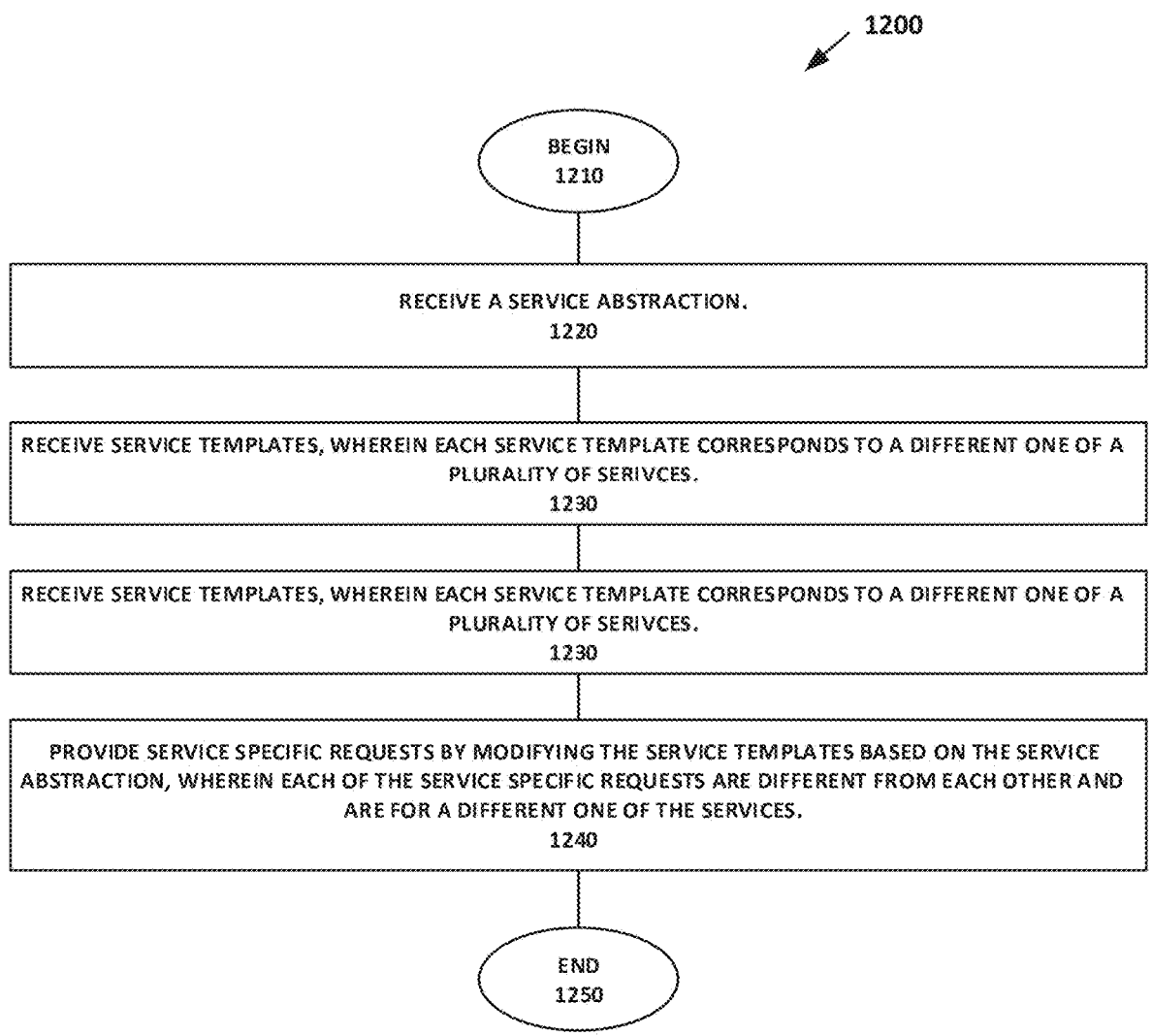
FIG. 12 depicts a method providing representation state transfer (REST) transformation, according to one embodiment.

FIG. 12 depicts a method providing representation state transfer (REST) transformation, according to one embodiment.

The following description of method 1200 shall refer to FIGS. 1A and 1B.

At 1210, the method 1200 begins.

At 1220, a service abstraction is received. For example, the tool 110 can receive a service abstraction 122 that a developer enters into the tool 110's user interface 112 and store it into memory 120. Alternatively, the tool 110 can receive a previously stored service abstraction 122 from memory 120.

At 1230, service templates are received. For example, the tool 110 can receive service templates 129 that a developer enters into the tool 110's user interface 112 and store it into memory 120. Alternatively, the tool 110 can receive previously stored service templates 129 from memory 120.

Each service templates 129 corresponds to a different one of a plurality of services. For example, service template 127 may be used with a server application 220 for one business and service template 128 may be used with a server application 230 for a different business. Examples of different business are Barnes and Noble® and Borders®.

At 1240, service specific requests are provided by modifying the service templates based on the service abstraction. For example, service specific request 124 can be provided by modifying service template 127 based on the service abstraction 122 and service specific request 126 can be provided by modifying service template 126 based on the service abstraction 122, as depicted in FIG. 1B.

Each of the service specific requests are different from each other and are for a different one of the services. For example, referring to FIG. 1B, service specific requests 124 and 126 are different from each other. Further, one of the service specific requests 124 can be used for communicating with a server application 220 for one business and the other service specific request 126 can be used for communicating with server application 230 for a different business.

At 1250, the method ends.

According to one embodiment, each of the services provide a similar type of service using a different interface. For example, the server applications 220, 230 both provide a similar type of service, such as selling books. The similarities enable determination of the service abstractions for filtering, sorting, pagination, and aria charts, as discussed herein. The service specific requests 124, 126 are examples of the different interfaces used for each of the services. More specifically, one interface uses EQUALS, while another uses "=.," while yet another uses "EQ." Although, EQUALS, "=," and "EQ" are different representations, they have the same meaning. The location and order of service abstraction's values placed in the service specific requests 124, 126 may differ. Keywords may also differ. For example, one may use the keyword filter while the other doesn't. One may use the keyword nameOp while the other doesn't.

According to one embodiment, each of the service templates correspond with a format of a particular service. For example, template 127 can correspond with the service provided by server application 210 and template 128 can correspond with the service provided by server application 230. Referring to FIG. 1B, the formats of the templates 127 and 128 are different.

According to one embodiment, the format is a uniform resource locator (URL) pattern. For example, both template 127 and 128 have formats that are URL patterns starting with "http:// . . . " and so on to the end of the URL pattern.

According to one embodiment, a particular service specific request is provided to a client application. For example, in response to a user selecting a user control 134, 144, the respective association 138, 148 is used to obtain the corresponding service specific request 136, 146. For example, if a user selects user control 134, the association 138 is used to obtain the service specific request 136. The service specific request 136 is communicated to the end point 224 of the server application 220 via the internet 210. The server application 220 performs processing to satisfy the service specific request 136. The end point 224 provides the output 242 of that processing to the client application 130 via the Internet 210.

In a similar manner, the service specific request 146 can be communicated to the end point 234 of the server application 230 via the internet 210 in response to a user selecting the user interface control 144. The server application 230 performs processing to satisfy the service specific request 146. The end point 234 provides the output 244 of that processing to the client application 140 via the Internet 210.

According to one embodiment, the particular service specific request is for one of pagination, filtering, and sorting.

According to one embodiment, each of the plurality of services are associated with a different company. For example, server application 210 may be associated with Barnes and Noble® and server application 230 may be associated with Borders®.

According to one embodiment, the service abstraction 122 includes parameters for a name and a filtering operation. Referring to the service abstraction 122 depicted in FIG. 1A, bob 112A is an example of a name, and equals 122B is an example of a filtering operation (also referred to as "filter operation").

According to one embodiment, the service abstraction 122 includes parameters for indicating if there is more data, the total number of items, and a page parameter in a payload for pagination. For example, the parameter for indicating if there is more data may be "HasMoreData," the parameter for the total number of items may be "TotalItems," and the "OtherStuff" parameter can be set to the value of the page parameter in the payload, as discussed herein.

According to one embodiment, the service abstraction 122 includes parameters for a name and sort operation criteria. For example, the name can be bob and the sort operation criteria can be set to ascending or descending.

Example Computer Environment

Figure 13:
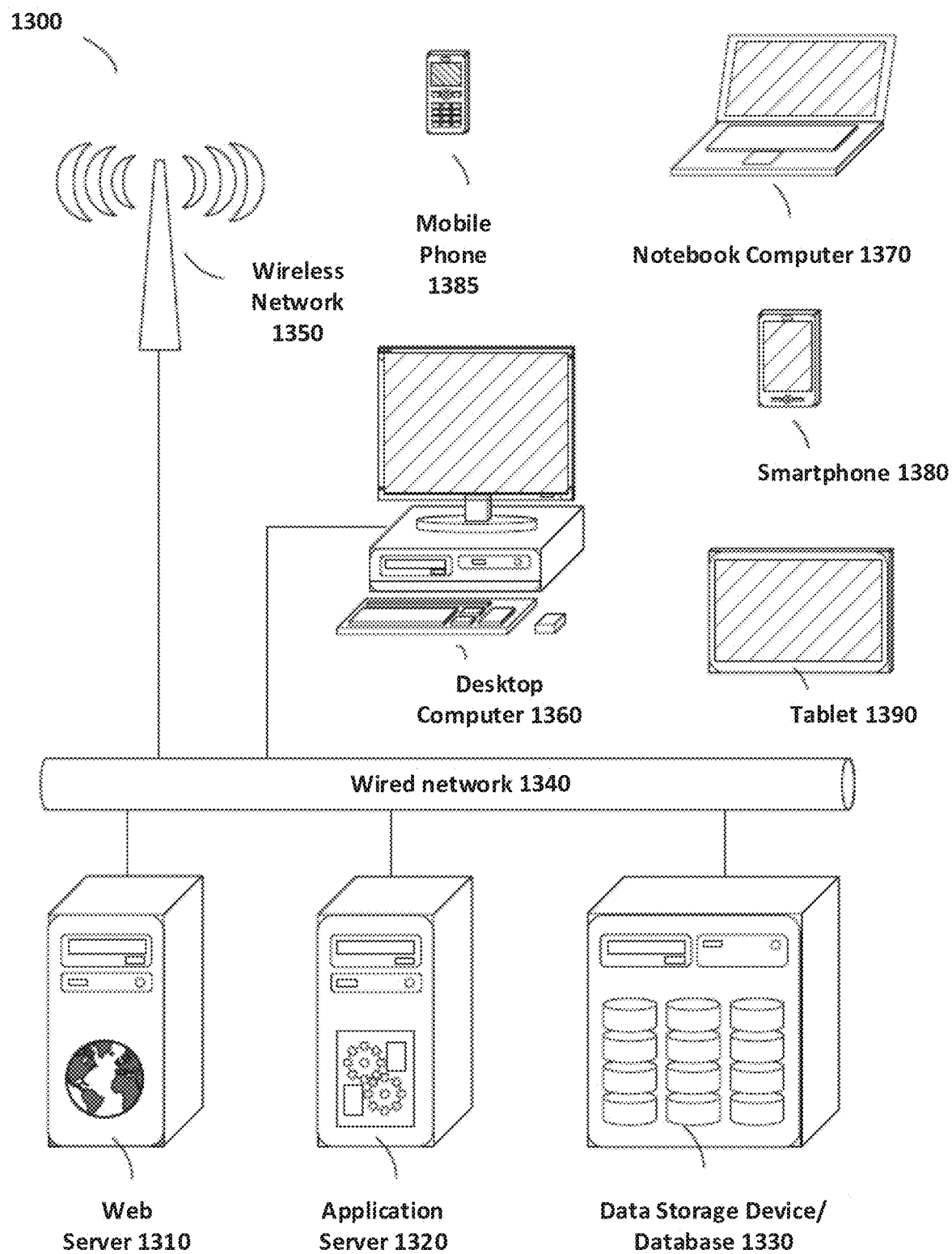
FIG. 13 is a general block diagram of a system and accompanying computing environment usable to implement the embodiments of Figures depicted herein.

FIG. 13 is a general block diagram of a system 1300 and accompanying computing environment usable to implement the embodiments of Figures depicted herein. The example system 1300 is capable of supporting or running various hardware and/or software modules and associated methods discussed with reference to FIG. 11. Note that certain embodiments may be implemented using one or more stand-alone applications (for example, residing in a user device) and/or one or more web-based applications implemented using a combination of client-side and server-side code.

The general system 1300 includes user devices 1360-490, including desktop computers 1360, notebook computers 1370, smartphones 1380, mobile phones 1385, and tablets 1390. The general system 1300 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1300 is shown with five user devices, any number of user devices can be supported.

A web server 1310 is used to process requests from web browsers and standalone applications for web pages, electronic documents, enterprise data or other content, and other data from the user computers. The web server 1310 may also provide push data or syndicated content, such as RSS feeds, of data related to enterprise operations.

An application server 1320 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can be created using HTML (HyperText Markup Language), CSS (Cascading Style Sheets), and other web technology, including templating languages and parsers.

The data applications running on the application server 1320 are adapted to process input data and user computer requests and can store or retrieve data from data storage device or database 1330. Database 1330 stores data created and used by the data applications. In an embodiment, the database 1330 includes a relational database that is adapted to store, update, and retrieve data in response to SQL format commands or other database query languages. Other embodiments may use unstructured data storage architectures and NoSQL (Not Only SQL) databases.

In an embodiment, the application server 1320 includes one or more general-purpose computers capable of executing programs or scripts. In an embodiment, web server 1310 is implemented as an application running on the one or more general-purpose computers. The web server 1310 and application server 1320 may be combined and executed on the same computers.

An electronic communication network 1340-1350 enables communication between user computers 1360-1390, web server 1310, application server 1320, and database 1330. In an embodiment, networks 1340-1350 may further include any form of electrical or optical communication devices, including wired network 1340 and wireless network 1350. Networks 1340-1350 may also incorporate one or more local-area networks, such as an Ethernet network, wide-area networks, such as the Internet; cellular carrier data networks; and virtual networks, such as a virtual private network.

The system 1300 is one example for executing applications according to an embodiment of the invention. In another embodiment, web server 1310, application server 1320, and optionally database 1330 can be combined into a single server computer application and system. In a further embodiment, virtualization and virtual machine applications may be used to implement one or more of the web server 1310, application server 1320, and database 1330.

In still further embodiments, all or a portion of the web and application serving functions may be integrated into an application running on each of the user computers. For example, a JavaScript application on the user computer may be used to retrieve or analyze data and display portions of the applications.

In a particular example embodiment, the user computing devices 1360-1390 run browsers, e.g., used to display the user interfaces. User interface may be viewed from a client computing device, such as a desktop computer 1360, notebook computer 1370, smartphone 480, mobile phone 1385, tablet 1390, of FIG. 13 and/or other computing devices.

In a particular example embodiment, browsers of the desktop computer 1360, notebook computer 1370, smartphone 1380, mobile phone 1385, tablet 1390 of FIG. 13 connect to the Internet, represented by the wired network 1340 and/or wireless network 1350 as shown in FIG. 13, to access one or more network-coupled servers, databases, and/or associated cloud-based functionality, as represented by the modules of FIG. 11. For example, one or more entities 110, 130, 140, 1101, 1104, 1105, and 1106 can reside on one or more application servers 1320. The client computer/device 1107 may be implemented as one or more of user computing devices 1360-1390. The client applications 130, 140, according to one embodiment, are executed by the tool 110. In this case, the client applications 130, 140 can reside in the tool 110 or in memory that the tool 110 accesses. The client applications 130, 140 can be accessed from one or more user computing devices 1360-1390 and the pages 132, 142 can be displayed in browsers of those respective user computing devices 1360-1390. One or more databases 1330 as shown in FIG. 13 may be used to host data, such as persistent store 1102 and state 1103, associated with FIG. 11. The data in hardware memory 120 can be implemented in part or in whole as a database 1330. The networks used for FIG. 11 can be implemented as networks 1340. For example, according to one embodiment, a network 1340 can be used to communicate between the client computer/device 1107 and components 1104. The server applications 220, 230 can reside on application servers 1320. The network 210 can be implemented as network 1340. One or more networks 1340 can also be used for providing communications between tool 110, hardware memory 120, and between the tool 110 and the client applications 130, 140.

Figure 14:
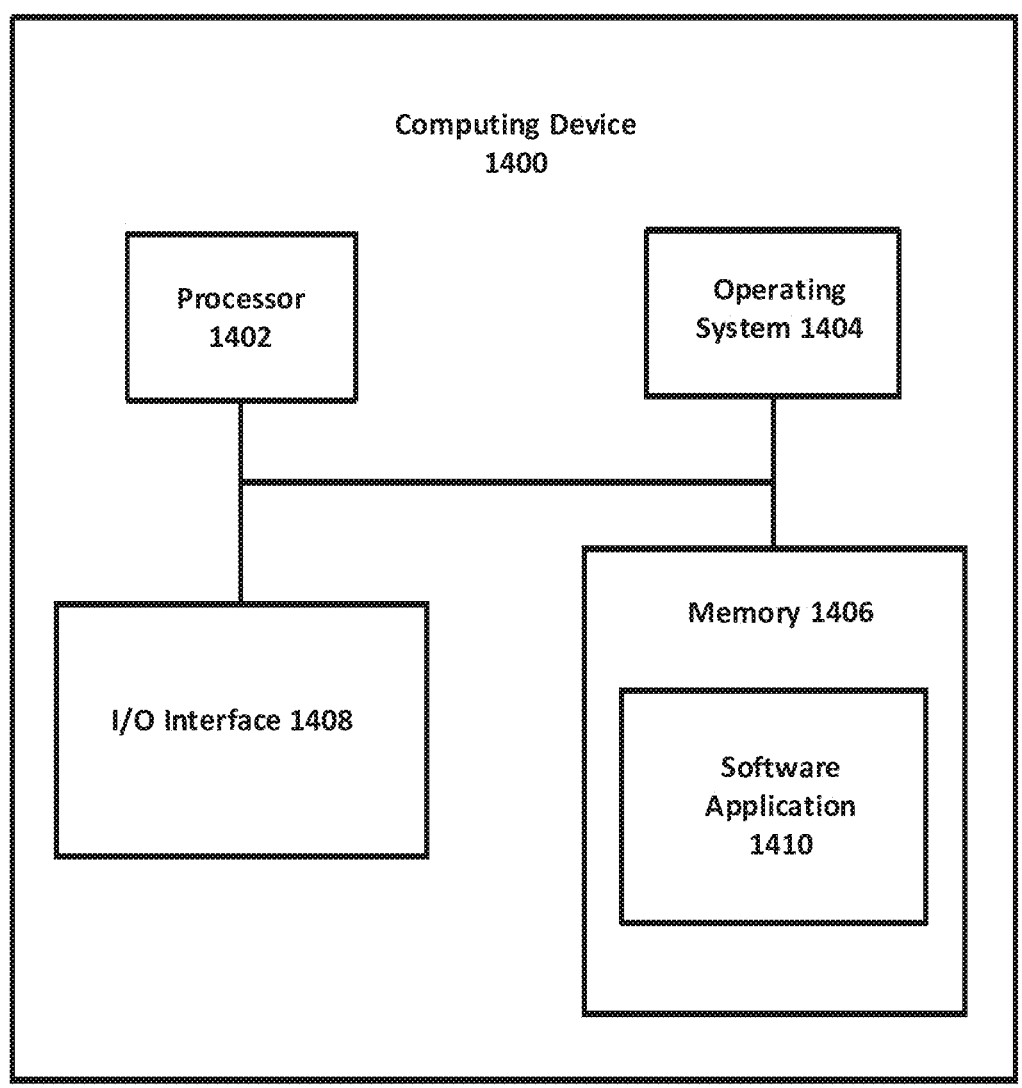
FIG. 14 is a general block diagram of a computing device usable to implement the embodiments described herein.

FIG. 14 is a general block diagram of a computing device 1400 usable to implement the embodiments described herein. While the computing device 1400 of FIG. 14 may be described as performing one or more of the steps in the embodiments herein, in other embodiments any suitable component or combination of components of the computing device 1400 or any suitable processor or processors associated with system 1400 may facilitate performing the steps.

FIG. 14 illustrates a block diagram of an example computing system 1400, which may be used for implementations described herein. For example, computing system 1400 may be used to implement user devices 1360-490, and server devices 1310, 1320 of FIG. 13 as well as to perform the method implementations described herein. In some implementations, computing system 1400 may include a processor 1402, an operating system 1404, a memory 1406, and an input/output (I/O) interface 1408. In various implementations, processor 1402 may be used to implement various functions and features described herein, as well as to perform the method implementations described herein. While processor 1402 is described as performing implementations described herein, any suitable component or combination of components of system 1400 or any suitable processor or processors associated with system 1400 or any suitable system may perform the steps described. Implementations described herein may be carried out on a user device, on a server, or a combination of both.

Computing device 1400 also includes a software application 1410, which may be stored on memory 1406 or on any other suitable storage location or computer-readable medium. Software application 1410 provides instructions that enable processor 1402 to perform the functions described herein and other functions. The components of computing system 1400 may be implemented by one or more processors or any combination of hardware devices, as well as any combination of hardware, software, firmware, etc.

For ease of illustration, FIG. 14 shows one block for each of processor 1402, operating system 1404, memory 1406, I/O interface 1408, and software application 1410. These blocks 1402, 1404, 1406, 1408, and 1410 may represent multiple processors, operating systems, memories, I/O interfaces, and software applications. In various implementations, computing system 1400 may not have all of the components shown and/or may have other elements including other types of components instead of, or in addition to, those shown herein.

A Computer Readable Medium and an Apparatus

Unless otherwise specified, any one or more of the embodiments described herein can be implemented using processor readable instructions which reside, for example, in non-transitory processor-readable storage device of a computer system or like device. The non-transitory processor-readable storage device can be any kind of physical memory that instructions can be stored on. Examples of the non-transitory processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within non-transitory processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The non-transitory processor-readable storage device is hardware memory and the one or more processors are hardware processors. According to one embodiment, a non-transitory processor-readable storage device is a tangible physical device.

An embodiment provides an apparatus comprising: one or more processors; and a non-transitory processor-readable storage device including instructions for: receiving a service abstraction receiving service templates, wherein each service template corresponds to a different one of a plurality of services; and providing service specific requests by modifying the service templates based on the service abstraction, wherein each of the service specific requests are different from each other and are for a different one of the services

CONCLUSION

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable storage device including instructions for a method of providing representation state transfer (REST) transformation, the method comprising:
receiving, at design time, a service abstraction for a service type;
receiving, at the design time, service templates for the service type, wherein each of the service templates corresponds to a different one of a plurality of services with associated interfaces for the service type, wherein each of the services has a different one of the interfaces for the service type;
providing, at the design time, service specific requests for the service type by modifying the service templates based on the service abstraction, wherein each of the service specific requests are different from each other and are for a different one of the services;
during runtime, communicating a first service request for the service type from a first client application to a first service, and communicating a second service request for the service type from a second client application to a second service; and
during runtime, receiving first output at the first client application that satisfies the first service request and receiving second output at the second client application that satisfies the second service request wherein the service abstraction includes parameters for indicating if there is more data, the total number of items, and a page parameter in a payload for pagination.

2. The non-transitory processor-readable storage device as recited by claim 1, wherein each of the service templates correspond with a format of a particular service.

3. The non-transitory processor-readable device as recited by claim 2, wherein the format is a uniform resource locator (URL) pattern.

4. The non-transitory processor-readable storage device as recited by claim 1, the method further comprising:
providing a particular service specific request to a client application.

5. The non-transitory processor-readable storage device as recited by claim 4, wherein the particular service specific request is for one of pagination, filtering, and sorting.

6. The non-transitory processor-readable storage device as recited by claim 1, wherein the service abstraction includes parameters for a name and a filtering operation.

7. The non-transitory processor readable storage device as recited by claim 1, wherein the service abstraction includes parameters for a name and sort operation criteria.

8. The non-transitory-readable storage device as recited by claim 1, wherein each of the plurality of services is associated with a different one of a plurality of companies.

9. The non-transitory processor-readable storage device as recited by claim 1, wherein the method further comprises:
receiving a first service abstraction for a first service type;
receiving a first template and a second template for the first service type, wherein the first template corresponds with a first service and the second template corresponds with a second service, and wherein the first service has a different interface than the second service;
providing a first service specific request for the first service type by modifying the first service template based on the first service abstraction;
providing a second service specific request for the first service type by modifying the second service template based on the first service abstraction, wherein the first service specific request is different than the second service request, and wherein the first service specific request is for the first service and the second service specific request is for a second service;
receiving a second service abstraction for a second service type;
receiving a third template and a fourth template for the second service type, wherein the third template corresponds with a third service and the fourth template corresponds with a fourth service, and wherein the third service has a different interface than the fourth service;
providing a third service specific request for the second service type by modifying the third service template based on the second service abstraction;
providing a fourth service specific request for the second service type by modifying the fourth service template based on the second service abstraction, wherein the third service specific request is different than the fourth service request, and wherein the third service specific request is for the third service and the fourth service specific request is for the fourth service;
receiving a third service abstraction for a third service type;
receiving a fifth template and a sixth template for the second service type, wherein the fifth template corresponds with a fifth service and the sixth template corresponds with a sixth service, and wherein the fifth service has a different interface than the sixth service;
providing a fifth service specific request for the third service type by modifying the fifth service template based on the third service abstraction; and
providing a sixth service specific request for the third service type by modifying the sixth service template based on the third service abstraction, wherein the fifth service specific request is different than the sixth service request, and wherein the fifth service specific request is for the fifth service and the sixth service specific request is for the sixth service.

10. The non-transitory processor-readable storage device as recited by claim 9, wherein the first service type is pagination, the second service type is filtering, and the third service type is sorting.

11. A method of providing representation state transfer (REST) transformation, the method comprising:

receiving, at design time, a service abstraction for a service type;

receiving, at the design time, service templates for the service type, wherein each of the service templates corresponds to a different one of a plurality of services with associated interfaces for the service type, wherein each of the services has a different one of the interfaces for the service type;

providing, at the design time, service specific requests for the service type by modifying the service templates based on the service abstraction, wherein each of the service specific requests are different from each other and are for a different one of the services;

during runtime, communicating a first service request for the service type from a first client application to a first service, and communicating a second service request for the service type from a second client application to a second service; and during runtime, receiving first output at the first client application that satisfies the first service request and receiving second output at the second client application that satisfies the second service request, wherein the service abstraction includes parameters for indicating if there is more data, the total number of items, and a page parameter in a payload for pagination.

12. The method as recited by claim 11, wherein each of the service templates correspond with a format of a particular service.

13. The method as recited by claim 12, wherein the format is a uniform resource locator (URL) pattern.

14. The method as recited by claim 11, the method further comprising: providing a particular service specific request to a client application.

15. The method as recited by claim 14, wherein the particular service specific request is for one of pagination, filtering, and sorting.

16. The method as recited by claim 11, wherein the service abstraction includes parameters for a name and a filtering operation.

17. The method as recited by claim 11, wherein each of the plurality of services is associated with a different one of a plurality of companies.

18. An apparatus comprising:

one or more processors; and a non-transitory processor-readable storage device including instructions for:

receiving, at design time, a service abstraction for a service type;

receiving, at the design time, service templates for the service type, wherein each of the service templates corresponds to a different one of a plurality of services with associated interfaces for the service type, wherein each of the services has a different one of the interfaces for the service type;

providing, at the design time, service specific requests for the service type by modifying the service templates based on the service abstraction, wherein each of the service specific requests are different from each other and are for a different one of the services;

during runtime, communicating a first service request for the service type from a first client application to a first service, and communicating a second service request for the service type from a second client application to a second service; and during runtime, receiving first output at the first client application that satisfies the first service request and receiving second output at the second client application that satisfies the second service request wherein the service abstraction includes parameters for indicating if there is more data, the total number of items, and a page parameter in a payload for pagination.

* * * * *

UNITED STATES PATENT AND TRADEMARK OFFICE
CERTIFICATE OF CORRECTION

| | |
|---|---|
| PATENT NO. | : 11,397,849 B2 |
| APPLICATION NO. | : 16/003027 |
| DATED | : July 26, 2022 |
| INVENTOR(S) | : Christian Straub |

It is certified that error appears in the above-identified patent and that said Letters Patent is hereby corrected as shown below:

In the Drawings

On sheet 13 of 15, in FIGURE 12, Line 7, delete "SERIVCES." and insert -- SERVICES. --, therefor.

On sheet 13 of 15, in FIGURE 12, Line 10, delete "SERIVCES." and insert -- SERVICES. --, therefor.

In the Specification

In Column 8, Line 16, delete "getCounties," and insert -- getCountries, --, therefor.

In Column 10, Line 56, delete "state)." and insert -- state. --, therefor.

In the Claims

In Column 17, Line 65, in Claim 3, delete "device" and insert -- storage device --, therefor.

In Column 18, Line 11, in Claim 7, delete "processor readable" and insert -- processor-readable --, therefor.

In Column 18, Line 14, in Claim 8, delete "non-transitory-readable" and insert -- non-transitory processor-readable --, therefor.

Signed and Sealed this
Seventeenth Day of January, 2023

*Katherine Kelly Vidal*

Katherine Kelly Vidal
*Director of the United States Patent and Trademark Office*